May 18, 1954     C. D. GIBSON     2,678,746
INDUSTRIAL LIFTING TRUCK

Filed Nov. 14, 1950     5 Sheets-Sheet 1

Inventor
CHRISTIAN D. GIBSON
By N. Dorsey Spencer
Attorney

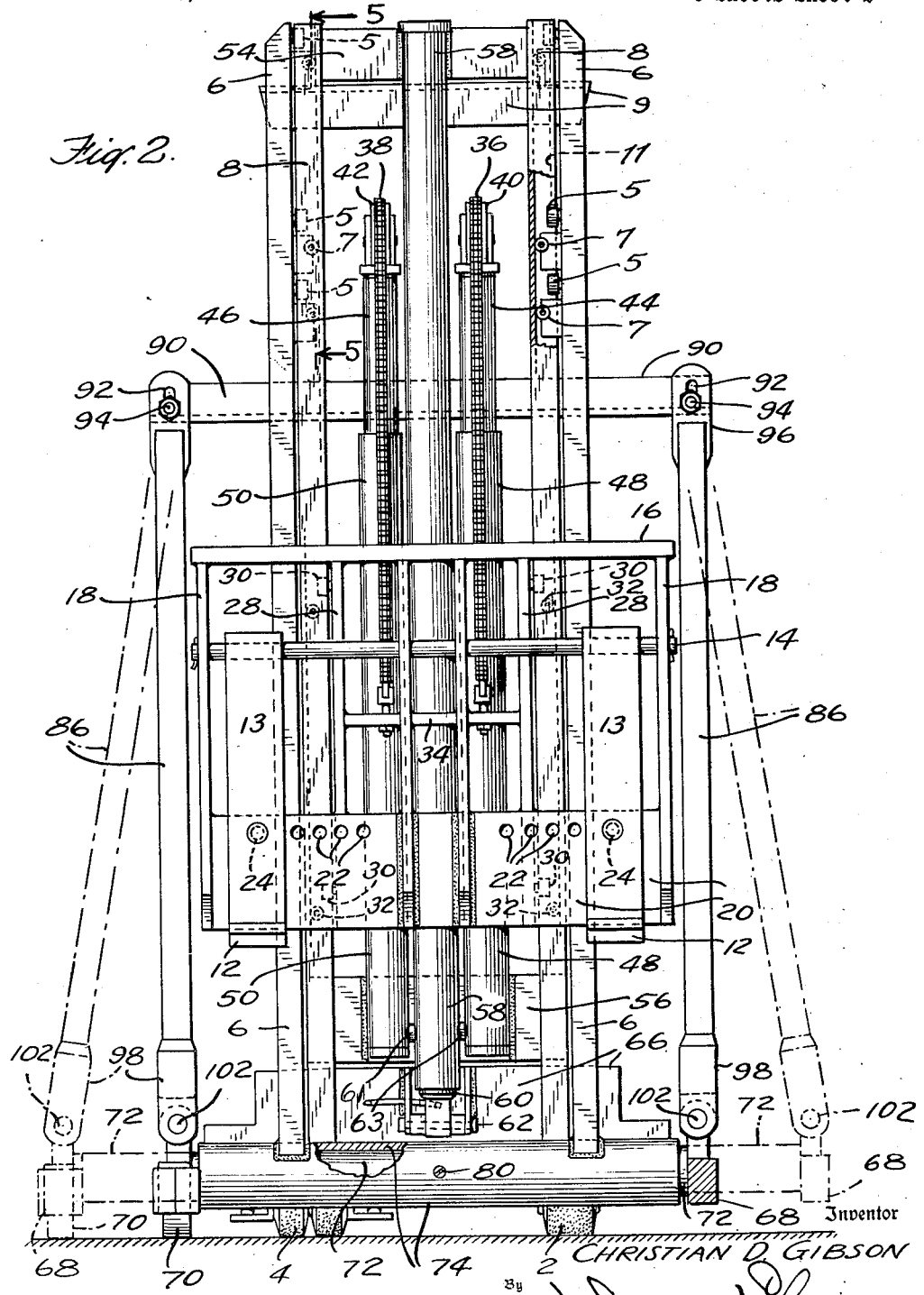

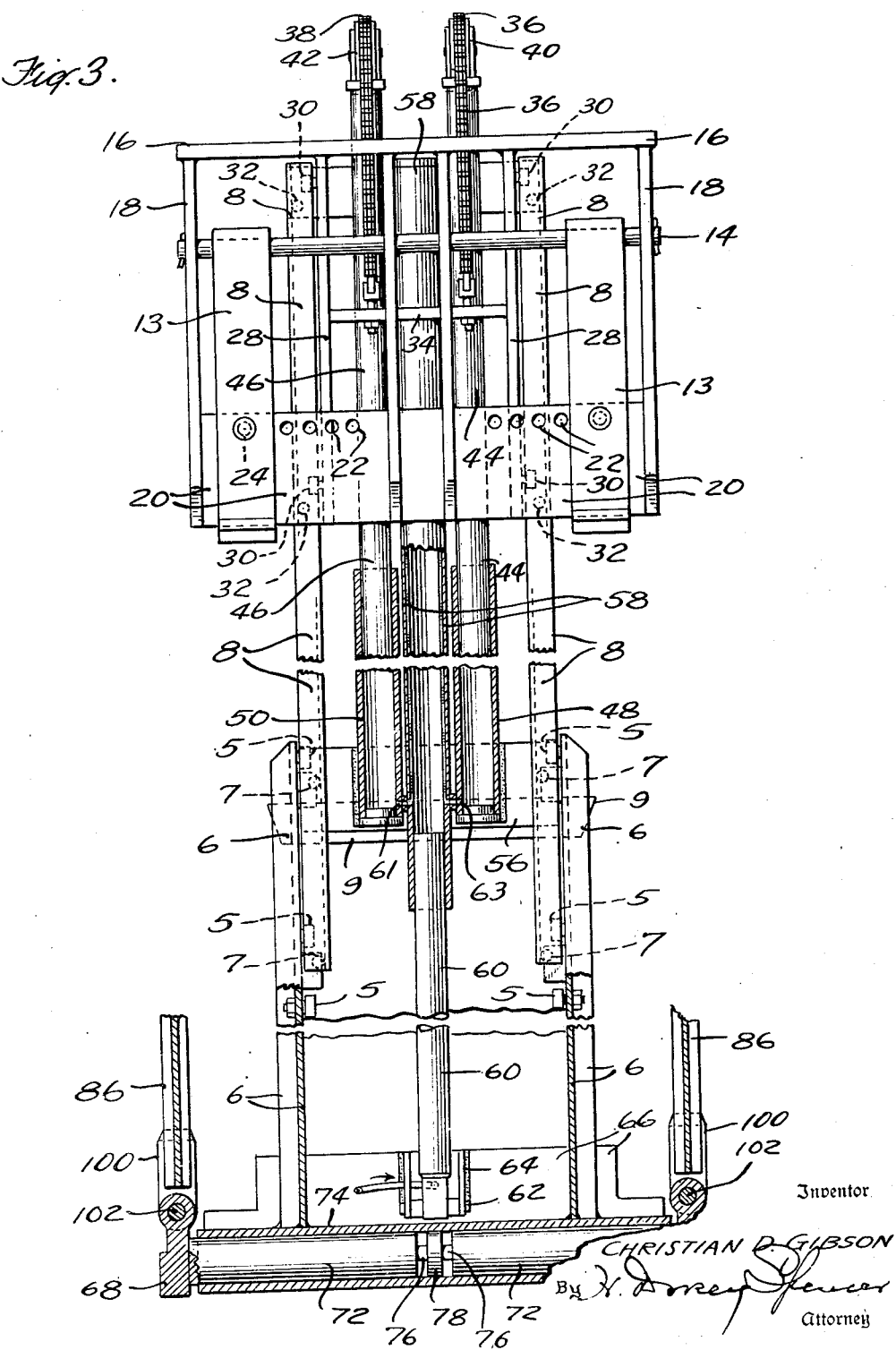

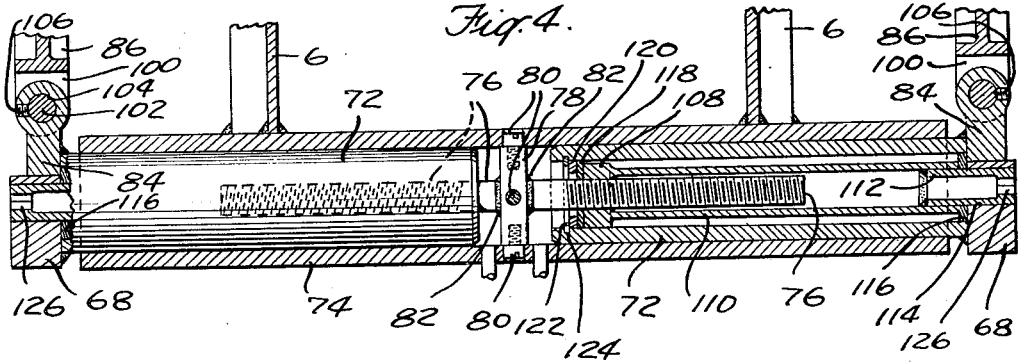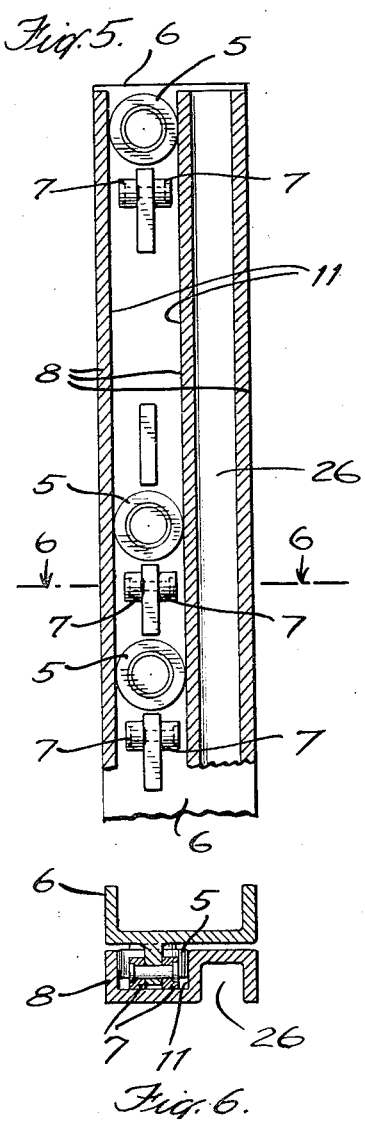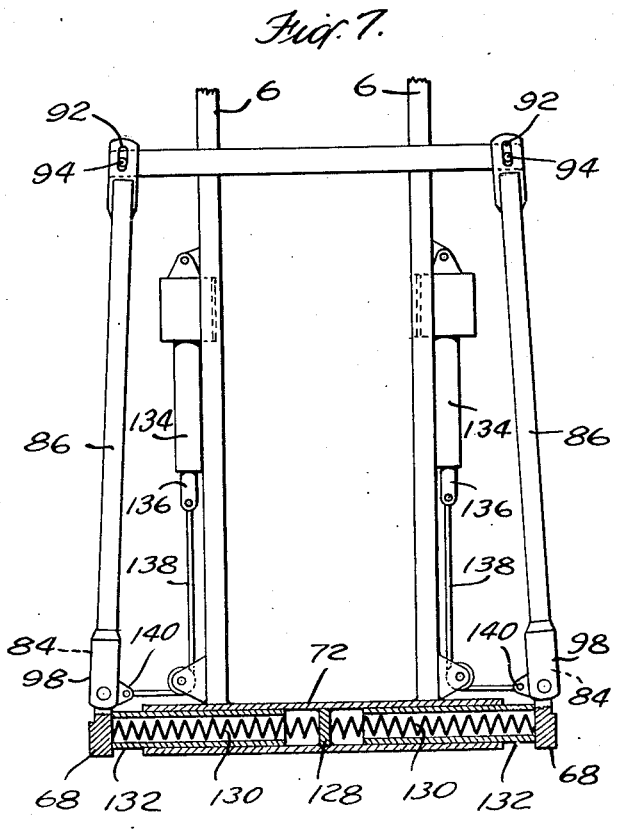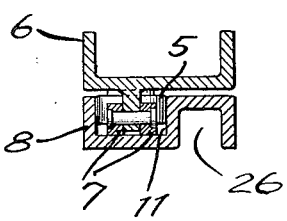

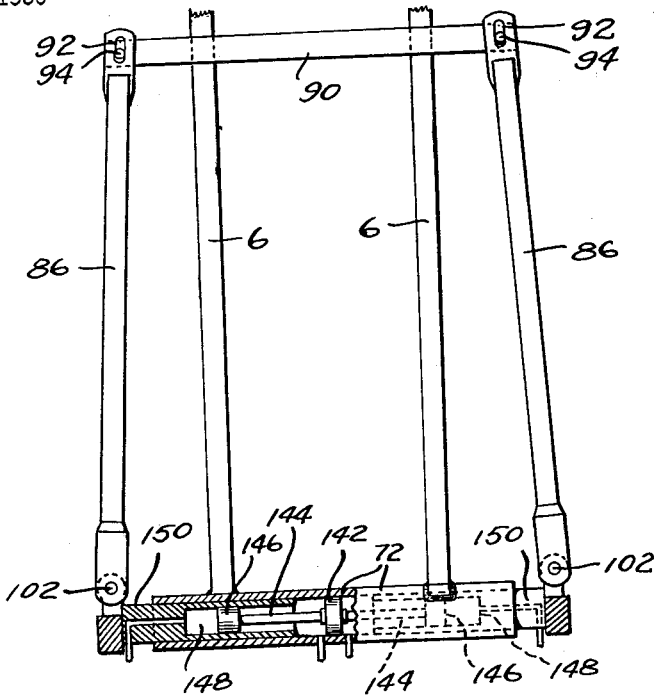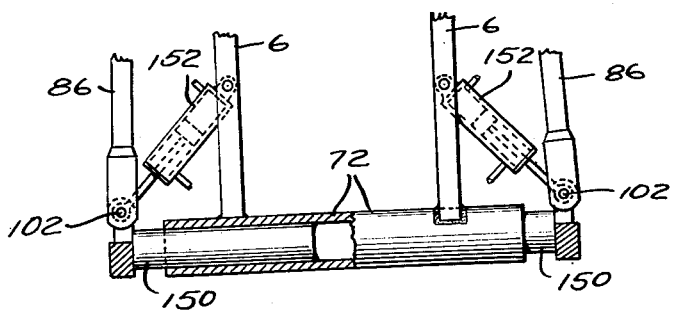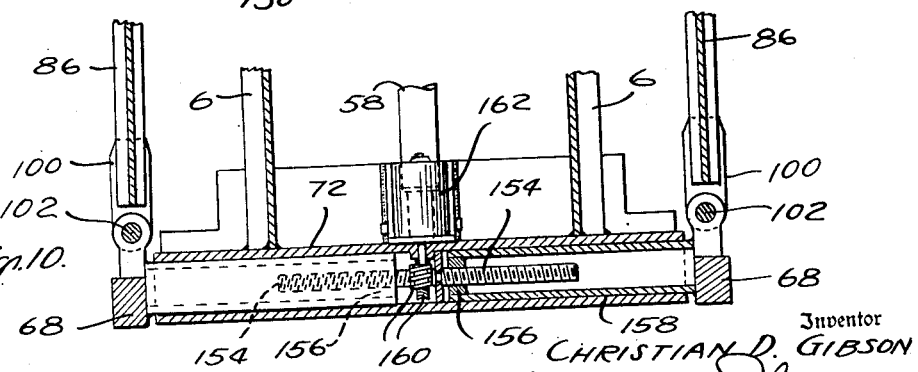

Patented May 18, 1954

2,678,746

UNITED STATES PATENT OFFICE 2,678,746

INDUSTRIAL LIFTING TRUCK

Christian D. Gibson, Greene, N. Y., assignor to The Raymond Corporation, Greene, N. Y., a corporation of New York Application November 14, 1950, Serial No. 195,526

13 Claims. (Cl. 214—730)

This invention relates to material handling trucks of the type now extensively used in factories, warehouses, etc. to pick up material to be moved, transport it to the desired new location and deposit it there with no manual handling of the material during these operations, the material to be moved being supported upon portable skids or pallets.

When trucks of the type just referred to operate to lift the material carrying pallet or skid to a considerable height above the floor, as, for example, when used in tiering goods, it is, of course, important that the vertical projection of the center of gravity of the load be kept well within the wheel base of the truck. A truck construction which is particularly suited to tiering and other operations in which the load is lifted to a considerable height above the floor is one in which the truck base is forked to straddle the load-carrying pallet or skid to be lifted, the pallet or skid engaging part of the lifting mechanism being located and operating between the fork members of the base.

Skids or pallets vary considerably in width and, therefore, if a truck of the straddle base type be designed to handle the widest pallets or skids, then when such a truck is operating upon loads carried upon narrower pallets or skids the truck turning area required will still be the same and, therefore, there will necessarily be a considerable amount of possible storage space wasted when manipulating the truck into position to lift the load and also when manipulating it into position to deposit the load. In other words, the truck will require a wider aisle for its transfer movements and a wider space for movement both into loading position and into unloading position than would be required were the straddle base designed for the narrower pallet or skid. Moreover, the spacings between adjacent pallets or skids at the base of a tier necessary to accommodate the fork members of the forked base when the truck is used for tiering will be greater than would be required were the spread of the fork members only sufficient for a skid or pallet of the width being handled.

An object of the present invention is to provide a truck of the straddle base type in which provision is made for adjustment of the straddle base to fit it for use, in a minimum of manipulating or steering space in each case, with pallets or skids of different widths. To this end the invention aims to provide a truck in which the fork members of the base, together with the truck-supporting wheels carried thereby, may be brought into different spaced relations to each other in such manner as not to disturb either the proper functioning of the lifting mechanism or the stability of the truck.

An important feature of the invention is the connection of the fork members of a straddle base truck to brace arms swinging from points on the frame located at a considerable distance above the base and the use of these arms to brace the fork members so that there is the same strong stable connection between the main truck frame and the fork members of the base in all adjusted relations.

Another important feature of the invention is the provision of telescopic supports for the fork members of the straddle base which together form a rigid cross connection between the fork members. Another important feature of the invention is the novel means for effecting the relative movements of the fork members of the straddle base to provide different spacings thereof, such means operating through the telescopic connections between the fork members.

In trucks of the type to which the invention is particularly directed the skid or pallet engaging means are usually in the form of a fork made up of prongs, each having an upstanding arm suspended from a shaft on the load-lifting carriage. To fit this pallet engaging fork to pallets or skids of various widths these arms are usually adjustable laterally on the shaft from which they are suspended. A further important feature of the present invention is improved means for securing the prongs of the pallet or skid engaging fork in their adjusted relation to each other, which means permit a much quicker and easier adjustment of the prongs into different positively secured spaced relations to each other than is possible with prong adjustments heretofore known.

The invention also contemplates improvements in the arrangement and timing of the hydraulic lifting mechanism by which the load lifting carriage is lifted into its elevated position. When picking up a load to be transferred to a new location it is usually preferable to carry the load at an intermediate elevation which is considerably below its maximum elevation and it is therefore important, particularly in a truck having a telescopic mast, that it be possible to elevate the load into convenient carrying position without starting the extension of the telescopic mast. An important feature of the present invention, therefore, is the novel means for bringing about this result.

Other objects, advantages and important features of the invention, to which attention has not hereinabove specifically been directed, will appear hereinafter when the following description and claims are considered in connection with the accompanying drawings, in which—

Figure 2 is a front elevation of the truck shown in Fig. 1;

Figure 3 is a front elevation similar to Fig. 2 but showing the load lifted to its maximum height, certain parts being broken away and other parts being in section;

Figure 1:
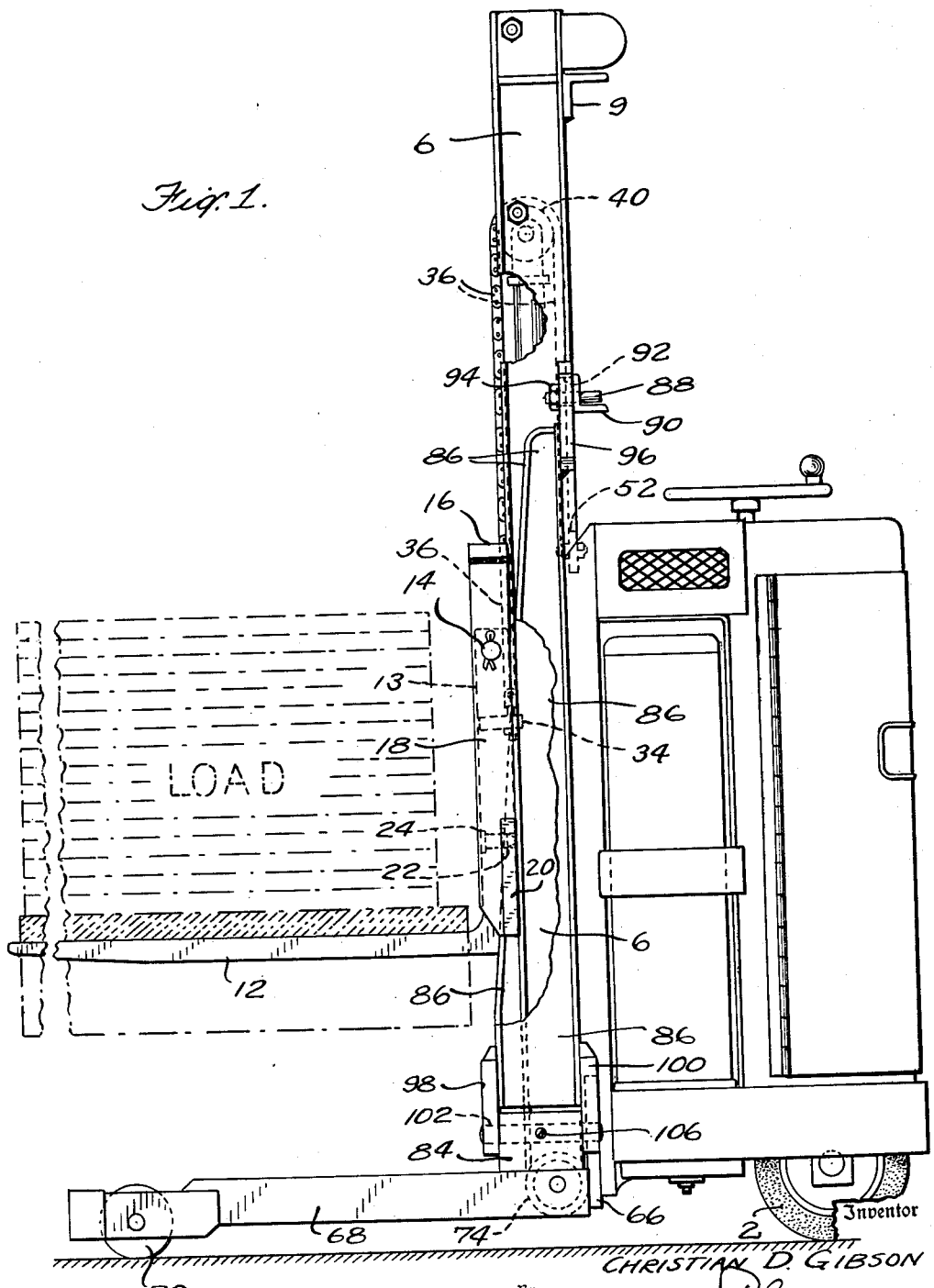
Figure 1 is a side elevation of a straddle base truck of the tiering type embodying the present invention.

Figure 4 is a longitudinal section through one form of telescopic connection between the fork members of the straddle base of the truck, this section being through the center of the telescopic connection between one fork member and the part of the telescopic connection which is permanently attached to the truck frame and showing merely the outside of the telescopic slide connected to the other fork member;

Figure 5 is an enlarged fragmentary section on the line 5—5 of Fig. 2;

Figure 6 is a section on the line 6—6 of Fig. 5;

Figure 7 is a detail view of modified means for effecting the adjustment of the fork members of the straddle base into different spacings to each other;

Figure 8 is a view of still another modification of means for adjusting the fork members of the straddle base into different spaced relations to each other;

Figure 9 is a detail view of still another modification of the fork member adjusting means, and Figure 10 is a detail view of a 4th modification of the means for adjusting the fork members of the straddle base into different spaced relations to each other, the mechanism shown in Fig. 10 differing from those shown in Figs. 7, 8 and 9 in that the adjustment of the fork members is simultaneous and equal and in opposite directions in the form shown in Fig. 10, whereas in the other three figures mentioned each fork member is adjustable independently of the other.

The invention is herein shown as embodied in a tiering truck of the straddle base type which is power driven by mechanism which may be of the type more fully shown and described in the co-pending application of Christian D. Gibson, Serial No. 116,777, filed September 20, 1949, now U. S. Letters Patent No. 2,564,002, granted August 14, 1951.

The automotive part of the illustrated truck, for a detailed description of which reference is made to the Letters Patent above identified, has a combined driving and steering wheel 2 offset to one side of the axis of symmetry of the truck and a stabilizing caster 4 on the other side of said axis, in order to permit manipulation in narrow aisles, and the supporting frame of the automotive part is rigidly connected in any suitable manner to the frame plate 66 of the load-lifting part of the truck. The elevating truck may be of the telescoping mast type, here shown, comprising a stationary mast frame made up of upright side members 6 connected near their top by a cross-piece 9, the side members 6 having thereon guide rollers 5 and thrust rollers 7 arranged to be received in grooves or tracks 11 in the upright side members 8 of the mast extension, or telescoping part of the mast, to permit vertical positively guided movement of this telescoping part. This extension movement of the telescoping mast, made up of the side frame members 8 and cross members hereinafter described, takes place only at the end of the movement of the load-carrying frame, now to be described, which has pallet engaging prongs 12 pivotally supported thereon. This load-carrying frame is movable from a lower position, in which the prongs 12 can be moved beneath the pallet or skid to be lifted, to a position near the top of the telescoping part of the mast.

From an inspection of Figure 2 it will be seen that the fork prongs 12 have upright portions 13 which are hung on a cross shaft 14 in a load-carrying frame made up of a top cross piece 16, side frame members 18 in which the cross shaft 14 is mounted and a bottom plate 20 connected to the back edges of the side frame members 18. The upright portions 13 of the prongs 12 rest against the cross plate 20 near their junctions with the prongs 12, being normally held there by gravity, thus maintaining the prongs 12 in substantially horizontal position.

The uprights 13 are hung on the shaft 14 both to swing thereon and to slide laterally thereon for adjustment into different spaced relations to each other. To maintain them in adjusted position the plate 20 is provided with holes 22 into which fit studs 24 on the rear faces of the uprights 13, gravity normally maintaining the studs 24 in interlocking relation to the particular holes 22 in which they are located. By merely swinging each upright 13 and its prong 12 outwardly and upwardly on the shaft 14 and sliding it lengthwise of the shaft in either direction the prongs 12 may be brought into different spaced relations to each other, the interlocking of the studs 24 with the selected holes 22 in the plate 20, when the prongs and arms swing back under the action of gravity, serving to maintain the prongs in their adjusted spaced relation to each other.

The load-carrying frame on which the fork prongs 12 are mounted is provided with guide and thrust rollers slidable vertically in grooves or tracks 26 on the inner edges of the side members 8 of the telescopic part of the mast, the load-carrying frame having welded to its rear face vertical bars 28 each having thereon upper and lower rollers 30 approximately fitting into the grooves 26 and each having associated with the rollers 30 thrust rollers 32 to hold the load-supporting frame against side tilting, the spaced upper and lower rollers 30 holding the frame against tilting forward or backward.

Extending between the roller-carrying vertical bars 28 is a crossbar 34 to which are connected chains 36 and 38 passing over pulleys 40 and 42 on the upper ends of hydraulic plungers 44 and 46 operating in cylinders 48 and 50. The cylinders 48 and 50 are supported upon a cross-frame member 56 between the side frame members 8 of the telescopic part of the mast. The chains 36 and 38 are connected at their other ends to a cross piece 52 attached to the rear faces of the side members 8 of the telescopic part of the mast. The introduction of hydraulic fluid into the cylinders 48 and 50 will cause the upward movement of the plungers 44 and 46 and thus cause the lifting of the load-carrying frame together with the pallet engaging fork prongs 12.

Since, by reason of the movement of the plungers 44 and 46 against a chain anchored at one end and connected at the other end to the load-carrier, the load carrier moves at a rate twice as fast and to a distance twice as far as the plungers 44 and 46, the pulley ends of the plungers 44 and 46 may effect the lifting of the load-carrier so that its upper bar 16 is substantially flush with the cross piece 54 at the upper ends of the side members 8 without carrying the pulley ends of the plungers much above this cross piece and thus the overall height of the truck, with the load lifted substantially throughout its first stage, may be approximately the same as the overall height of the truck with the load in its pick-up position.

The lifting mechanism is operated in such manner that there is no extension of the telescopic part of the truck before the load has been lifted to its maximum height on the telescopic part. This is an important feature of the novel truck of the present invention since it permits movement of the truck, with a load carried at a substantial elevation, under any overhangs that the unloaded truck will clear.

To bring about this sequence of operations the cylinders 48 and 50, as above stated, are carried on a cross frame member 56 extending between the side frame members 8 of the telescopic part of the lifting mechanism. Extending up between these cylinders 44 and 46 is a cylinder 58 of a third hydraulic ram or jack, connected at its upper end to the cross piece 54 of the telescopic part of the mast. A plunger 60, over which the cylinder 58 slides, is hinged on a cross shaft or hinge pin 62 extending between brackets 64 on a plate 66 connected to the rear faces of the side members 6 of the stationary part of the mast.

The hydraulic fluid is introduced into the cylinder 58 through the stationary plunger 60, as shown, and eventually causes the cylinder 58 to ride up on the plunger 60 and lift the telescopic part of the mast, together with the load-carrying frame and any load thereon. However, by reason of the arrangement of the hydraulic connections shown, in which the hydraulic fluid is introduced first through the plunger 60 into the cylinder 58 which has connections 61 and 63 with the cylinders 48 and 50, the hydraulic fluid, instead of acting first to cause the upward movement of the cylinder 58 on the plunger 60, first moves on from the cylinder 58 into the cylinders 48 and 50 and thus effects the upward movement of the plungers 44 and 46 in said cylinders to the upper limit of their movement, after which further introduction of fluid through plunger 60 into the cylinder 58 causes this cylinder to move up on its plunger 60, carrying with it the telescopic mast extension, the load carrier and load and the cylinders 48 and 50 and the parts associated therewith. The lifting of the load carried by the prongs 12 up the telescopic part of the mast obviously requires less hydraulic effort than the lifting of the load plus the weight of the telescoping mast and the three cylinders 48, 50 and 58 carried thereby and therefore it necessarily takes place first.

As hereinabove suggested, in this type of truck, in which the load is lifted to a considerable vertical height above the floor when tiering goods, say to a maximum distance of twenty feet, it is of course important that the vertically projected center of gravity of the load be kept well within the wheel base of the truck. For this reason the straddle type of base is particularly useful since it insures the location of the load at least laterally within the wheel base to start with. The straddle base here shown comprises essentially fork members 68, each having near its outer or front end a supporting wheel 70, these fork members extending forwardly from the supporting frame. The illustrative means for so mounting these fork members 68 that they may be adjusted to different spacings to fit, without waste of floor space required for manipulation, pallets or skids of different widths will now be described. As shown in Figures 1 to 3 inclusive, each fork member 68 is rigidly connected, as by welding, at its rear end with the outer end of a telescopable slide 72 which may be, as here shown, cylindrical in shape and which slides with a close sliding fit within a larger cylinder 74 rigidly attached to the vertical mast members 6. As above stated, it will be seen that the mast members 6 are themselves connected by a plate 66 which is also welded to the cylinder 74.

As shown more particularly in Figure 4, the cylindrical telescopable member 72 is hollow and has therein means, more fully described hereinafter, by which it may be adjusted along a threaded rod 76 projecting axially into the interior of the cylindrical telescopable member 72, there being two of these threaded rods 76, one for each of the telescopable members 72, extending in opposite directions from a centrally located disk 78 fitting within and secured in central position in the fixed cylinder 74 by thick-headed machine screws 80 screwed through openings in the wall of said cylinder 74, each of these rods, or a single rod extending through the disk 78 to both sides thereof, being welded to the disk 78, as shown at 82.

It will be seen that, if means are not provided to prevent turning of the cylindrical telescopic members 72 about their axes, there will not be proper support of the fork members 68 of the straddle base. Bracing means are therefore provided, here shown as comprising hinge pin carrying brackets 84 welded both to the ends of the telescopic slides 72 and to the upper edges of the fork members 68, the brackets 84 being hinged to brace links 86. The brace links 86, here shown as preferably of I shape in cross section for increased stiffness, are brace shaped in longitudinal contour, that is, they are wider at the bottom where they are hinged to the brackets 84 than at their tops where they have combined sliding and pivotal connections with studs 88 carried on the projecting ends of an angle bar 90 welded to the rear faces of the fixed mast members 6. It will be seen that each of the brace links 86 is provided with a slot 92 which receives the stud 88 and that a nut 94 on the threaded end of each stud 88 may be tightened against the flat extension 96 of each brace bar 86 to avoid any undesirable back lash movements of the brace bars 86. At its lower end each brace bar 86 has welded to its flanged edges plates 98 and 100 which straddle the bracket 84 and have openings to receive a hinge pin 102 received in an opening 104 in the bracket 84 and secured therein, when in proper adjusted relation to the bracket and plates 98 and 100, by a set screw 106.

From the foregoing description it will be seen that the brace bars 86, which swing on their hinge connections to the brackets 84 about hinge axes substantially parallel to fork members 68 and perpendicular to the direction of movements of the slides 72 into different angular relations to the axes of the cylindrical telescopic slides 72 as these are adjusted in and out of the cylinder 74, provide effective means for preventing the cylindrical telescopic slides 72 from turning about their axes in the cylinder 74.

As hereinabove suggested, suitable means are provided for conveniently adjusting the cylindrical slides 72 in and out of their cylindrical guideways in the cylinder 74 to effect variations in the spacings of the fork members 68. In Figure 4 is illustrated in detail the adjusting means shown in Figs. 1, 2 and 3, and in Figures 7, 8, 9 and 10 are shown modifications of the adjusting means.

In the form shown in Figure 4 the adjustment of the cylindrical slide 72 is effected by means of a nut 108 threaded upon the rod 76, the nut 108 being welded to one end of a rotatable tube 110 that has secured within its interior at its other end a cylindrical shaft extension 112 having a bearing in an opening 114 drilled through the arm 68 where this arm overlaps the end of the cylinder 74. The shaft 112 is secured within the tube 110 by brazing or other suitable means. It will be seen that the shaft 112, resting in its bearing 114 at one end, and the nut 108, welded to the tube 110 at its other end, together center the tube 110 both within the hollow interior of the cylindrical slide 72 and on the threaded rod 76. A thrust washer 116 between the outer end of the rotatable tube 110 and the inner face of the overlapping part of the fork member 68, which is welded to the cylindrical slide 72, and a similar thrust washer 118 bearing against the inner face of the nut 108 and confined thereagainst by a washer 120 held in place by a split ring 122 received in an inner groove 124 in the slide 72, confine the tube 110 to movement with the slide 72 while permitting rotary movement thereof. The thrust washers 116 and 118 are preferably of anti-friction composition.

At its outer end the shaft 112 is provided with a squared opening 126 to receive a wrench for turning the tube 110 and with it the nut 108 to effect the adjustment of the slide 72 along the screw-threaded rod 76 and into and out of the cylindrical guideway in the cylinder 74. As shown in Figure 4, there is a separate adjustment for each of the slides 72 so that each can be adjusted independently of the other. In practice, however, it is usually customary to effect a like adjustment of each to maintain a substantially symmetrical arrangement of the fork members 68 on the truck body.

In Figure 7 are shown modified means for effecting the adjustment of the fork arms. In this fiure the cylinder 72 is of substantially the construction of the cylinder 72 above described except that the partition 128 at the mid point thereof does not carry screw threaded rods 76 for the purposes above described but instead serves as an abutment for springs 130 seated in sockets in cylindrical slides 132 to which the fork members 68 and the brace links 86 are connected in the manner hereinabove set forth. The springs 130 are so tensioned that they tend to move the slides 132 to their extreme outer adjusted position. They may be held in their adjusted position by connections to any suitable actuating devices 134 of which two are shown here, one for each slide 132. The actuating device may be either a hydraulic jack or an electric motor operating to move a shaft or plunger 136 up or down to cause a cord or chain 138, connected at one end to the shaft or plunger 136 and at its other end to an ear 140 on the bracket 84, to pull the slide 132 inward against the tension of the spring 130 or to permit it to move outward under the action of the spring 130.

Although separate means 134 are shown for adjusting each of the fork members 68 separately, it will be obvious that both cords or chains 138 might be connected to a single operating device 134 and thus the adjustment of the two fork members 68 could be effected equally and simultaneously.

In the modified form of the slide adjusting means shown in Figure 8, the cylinder 72 has connected to its central partition 142 piston rods 144 connected to pistons 146 in cylinders 148 in slides 150 modified as just described. Hydraulic fluid can be introduced into the cylinders 148 on one side or the other of the anchored pistons 146 in order to effect a relative movement of the slide 150 and piston 146 to effect the adjustment of the slide in or out of its guideway in the cylinder 72. As in the forms of the invention hereinabove described, the introduction of the hydraulic liquid into the cylinders 148 may be effected independently to secure independent adjustment of the slides 150 or it may be effected simultaneously in both cylinders 148 to secure simultaneous and equal adjustment. It is, of course, possible, as shown in Figure 9, to omit the interior piston rod 144, piston 146 and cylinder 148 and connect a hydraulic jack 152 to one of the side members 6 of the fixed mast at one end and to the hinge pin 102 at its other end and thus effect the movement of the slide 150 in and out of the cylinder 72. A similar arrangement of jack and connections would also be provided for adjusting the other fork member 68.

In the modified form of slide operating means shown in Figure 10, a rotatable screw 154 having a bearing in the central partition in the cylinder 72 is threaded through a nut 156 fixed in each cylindrical slide 158 and may be turned by a worm and worm wheel 160 driven by a motor 162, the motor 162 being mounted on the truck base in any suitable manner.

In commercial practice it has been found that the form of the invention shown in Figure 4 provides a simple and satisfactory solution of the problem of effecting the adjustment of the fork members 68 in respect to each other.

What is claimed as new is:

1. In a lifting truck, the combination with load lifting means of a wheel-supported base upon which said lifting means are mounted for transportation with the lifted load, said base including wheel-supported fork members projecting forwardly from a body portion thereof on which said lifting means are mounted and each having a transversely slidable connection to said body, cooperating means connected respectively to said base fork slides and to said body to prevent deflection of said base forks, under load conditions and in any position of lateral adjustment, from their normal projecting relation to said body, said fork members having their supporting wheels located near their front ends, and being arranged to straddle the load to be lifted, and means for effecting adjustment of said base forks on the base body into different spaced relations to each other.

2. A lifting truck according to claim 1 having a mast fixed to the base body and having a brace link for each slide hinged to the slide at one end and connected to the mast at its other end, the hinge axes being transverse to the path of travel of the slides.

3. A lifting truck according to claim 1 in which the slides are cylindrical and snugly fit correspondingly shaped guideways in the base.

4. A lifting truck according to claim 1 in which the slides are cylindrical and snugly fit correspondingly shaped guideways in the base and in which a brace link for each slide, hinged to the slide to turn about an axis transverse to the cylinder axis, is adjustably connected to the truck body to hold the slides from turning about their axes.

5. A lifting truck according to claim 1 in which means located within the slides and guideways operates to effect the relative base fork member adjusting movement of said slides and guideways.

6. A lifting truck according to claim 1 in which the slides are cylindrical and snugly fit correspondingly shaped guideways and in which for each slide a threaded rod and a nut threaded thereon, one attached to the guideway and the other movable with the slide, are coaxially arranged within their respective carrying parts to turn relatively to each other to effect the movement of said slide relative to said guideway.

7. A lifting truck according to claim 1 having a mast fixed to the base body and having a brace link for each slide hinged to the slide at one end and connected to the mast at its other end, the hinge axes being transverse to the path of travel of the slides and the connection between the brace link and the mast comprising a stud and slot to adjust for varying distances between the mast connection and the hinge connection.

8. In a lifting truck, a fork for engaging a pallet or skid, a vertically movable carriage on which said fork is mounted with provision for varying the lateral spacing of the prongs thereof, said carriage having thereon a horizontal shaft and said prongs having upturned arms suspended from said shaft and laterally slidable and swingable thereon, a stop plate on said carriage against which gravity swings said arms and which serves to maintain said prongs in operative load-supporting relation to said carriage, said plate and each of said prong arms having cooperative interlocking parts disengageable by a mere swing of the arm away from said plate.

9. A lifting truck according to claim 8 in which on the plate there are a plurality of laterally spaced parts each capable of cooperation with the related part carried by a prong arm in the appropriate position of lateral adjustment of the prong arm on its carrying shaft.

10. A lifting truck according to claim 8 in which the cooperative interlocking parts comprise a stud on each prong arm entering a hole in the stop plate and in which a plurality of suitably located laterally spaced holes in the stop plate provide for locking the prong arms in different positions of lateral adjustment on their supporting shaft.

11. A lifting truck according to claim 1 in which power operated means are provided for effecting the relative base fork adjusting movements of the adjustable slides.

12. A lifting truck according to claim 11 in which the power operated means comprise hydraulic jack means for effecting the relative base fork adjusting sliding movements of the fork member carrying slides.

13. A lifting truck according to claim 2 in which hydraulic jacks located between the mast and the brace links effect the relative base fork adjusting movements of the adjustable slides.

References Cited in the file of this patent

UNITED STATES PATENTS

| Number | Name | Date |
|---|---|---|
| 2,320,601 | Howell | June 1, 1943 |
| 2,332,443 | Foringer | Oct. 19, 1943 |
| 2,339,120 | Ulinski | Jan. 11, 1944 |
| 2,365,167 | Billings | Dec. 19, 1944 |
| 2,368,122 | Dunham | Jan. 30, 1945 |
| 2,393,902 | Hastings, Jr. | Jan. 29, 1946 |
| 2,421,472 | Way | June 3, 1947 |
| 2,477,167 | Bliss | July 26, 1949 |
| 2,480,066 | Weaver | Aug. 23, 1949 |
| 2,505,009 | Schroeder | Apr. 25, 1950 |
| 2,520,857 | Schreck | Aug. 29, 1950 |
| 2,541,268 | Milz | Feb. 13, 1951 |
| 2,594,540 | Cole et al. | Apr. 29, 1952 |